United States Patent [19]
Davies et al.

[11] Patent Number: 5,564,061
[45] Date of Patent: Oct. 8, 1996

[54] RECONFIGURABLE ARCHITECTURE FOR MULTI-PROTOCOL DATA COMMUNICATIONS HAVING SELECTION MEANS AND A PLURALITY OF REGISTER SETS

[75] Inventors: Eric Davies; Daun Langston, both of Grass Valley, Calif.

[73] Assignee: Silicon Systems, Inc., Tustin, Calif.

[21] Appl. No.: 201,716

[22] Filed: Feb. 25, 1994

Related U.S. Application Data

[63] Continuation of Ser. No. 528,951, May 25, 1990, abandoned.

[51] Int. Cl.⁶ ................................................... G06F 13/10
[52] U.S. Cl. ................. 395/884; 395/286; 395/310; 395/311; 395/831; 395/500
[58] Field of Search .................................. 395/325, 500, 395/286, 310, 311, 831, 884, 891

[56] References Cited

U.S. PATENT DOCUMENTS

| | | | |
|---|---|---|---|
| 4,006,457 | 2/1977 | Hepworth et al. | 377/26 |
| 4,071,887 | 1/1978 | Daly et al. | 395/309 |
| 4,156,932 | 5/1979 | Robinson et al. | 395/823 |
| 4,187,394 | 2/1980 | Sievers | 370/41 |
| 4,509,113 | 4/1985 | Heath | 395/275 |
| 4,682,304 | 7/1987 | Tierney | 395/872 |
| 4,823,312 | 4/1989 | Michael et al. | 395/250 |
| 4,841,440 | 6/1989 | Yonezu et al. | 395/750 |
| 4,843,389 | 6/1989 | Lisle et al. | 341/106 |
| 4,930,065 | 5/1990 | McLagan et al. | 395/870 |
| 4,964,124 | 10/1990 | Burnett | 371/15.1 |
| 4,982,325 | 1/1991 | Tignor et al. | 395/309 |
| 5,063,494 | 11/1991 | Davidowski et al. | 395/800 |
| 5,134,691 | 7/1992 | Elms | 395/200.01 |
| 5,179,661 | 1/1993 | Copeland, III et al. | 395/250 |

*Primary Examiner*—Ken S. Kim
*Attorney, Agent, or Firm*—Hecker & Harriman

[57] ABSTRACT

The present invention provides a configurable architecture for serial communications. The architecture can emulate parallel to serial conversion devices for both synchronous and asynchronous data transmission. The invention uses a plurality of register sets to emulate standard interfaces. One register block performs data and control storage to communicate between a host computer and a local processor. A second register block emulates a serial communications controller (SCC) with its own data control storage and features to implement a number of communication protocols. The SCC provides serial data output. This invention provides an architecture of flexibility optimizing a configuration for synchronous and asynchronous requirements using the same basic blocks while still maintaining an interface compatible with standard requirements.

34 Claims, 9 Drawing Sheets

| REGISTER | | ADDRESS A2-A0 | D7 | D6 | D5 | D4 | D3 | D2 | D1 | D0 |
|---|---|---|---|---|---|---|---|---|---|---|
| | | | | | | DATA BIT NUMBER | | | | |
| RECEIVER BUFFER REGISTER (READ ONLY) | RBR | 0 DLAB=0 | BIT 7 (MSB) | BIT 6 | BIT 5 | BIT 4 | BIT 3 | BIT 2 | BIT 1 | BIT 0 (LSB) |
| TRANSMIT HOLDING REGISTER (WRITE ONLY) | THR | 0 DLAB=0 | BIT 7 (MSB) | BIT 6 | BIT 5 | BIT 4 | BIT 3 | BIT 2 | BIT 1 | BIT 0 (LSB) |
| INTERRUPT ENABLE REGISTER | IER | 1 DLAB=0 | REGISTER SELECT 1 (SINGLE CS) | REGISTER SELECT 0 (SINGLE CS) | SSI ENABLE (SINGLE CS) | 0 | ENABLE MODEM STATUS | ENABLE RECEIVER STATUS | ENABLE THRE | ENABLE RDA |
| INTERRUPT ID REGISTER (READ ONLY) | IIR | 2 | FIFOS ENABLED | FIFOS ENABLED | RXRDY (SSI ENABLE) | TXRDY (SSI ENABLE) | INTERRUPT ID 2 | INTERRUPT ID 1 | INTERRUPT ID 0 | "0" IF INTERRUPT PENDING |
| FIFO CONTROL REGISTER (WRITE ONLY) | FCR | 2 | RCVR TRIGGER 1 | RCVR TRIGGER 0 | XMIT TRIGGER 1 (SSI ENABLE) | XMIT TRIGGER 0 (SSI ENABLE) | DMA MODE SELECT | XMIT FIFO RESET | RCVR FIFO RESET | FIFO ENABLE |
| LINE CONTROL REGISTER | LCR | 3 | DIVISOR LATCH ACCESS (DLAB) | SET BREAK | STICK PARITY | EVEN PARITY | PARITY ENABLE | NUMBER STOP | WORD LENGTH SELECT 1 | WORD LENGTH SELECT 0 |
| MODEM CONTROL REGISTER | MCR | 4 REGSEL=0 | 0 | 0 | 0 | LOOP | ENABLE INTERRUPT | UPRST | RTS | DTR |
| LINE STATUS REGISTER | LSR | 5 REGSEL=0 | ERROR IN RECEIVE FIFO | TRANSMIT EMPTY | TRANSMIT HOLDING EMPTY | BREAK INTERRUPPT (BI) | FRAMING ERROR (FE) | PARITY ERROR (PE) | OVERRUN ERROR (OE) | DATA READY (DR) |
| MODEM STATUS REGISTER | MSR | 6 REGSEL=0 | DCD | RI | DSR | CTS | DELTA DCD | TRAILING EDGE RI | DELTA DSR | DELTA CTS |
| SCRATCH REGISTER | SCR | 7 REGSEL=0 | BIT 7 | BIT 6 | BIT 5 | BIT 4 | BIT 3 | BIT 2 | BIT 1 | BIT 0 |
| DIVISOR LATCH (LS) | DLL | 0 DLAB=1 | BIT 7 | BIT 6 | BIT 5 | BIT 4 | BIT 3 | BIT 2 | BIT 1 | BIT 0 |
| DIVISOR LATCH (MS) | DLM | 1 DLAB=1 | BIT 15 | BIT 14 | BIT 13 | BIT 12 | BIT 11 | BIT 10 | BIT 9 | BIT 8 |

FIG. 5B

| REGISTER | | ADDRESS UCR[3:0] | D7 | D6 | D5 | D4 | D3 | D2 | D1 | D0 |
|---|---|---|---|---|---|---|---|---|---|---|
| UART COMMAND REGISTER (WRITE ONLY) | UCR | D/C=A/B=0 ONECS=1; D/C=0 RS=1 RGSEL0=1 | 0 | 0 | 0 | 0 | REGISTER SELECT 3 | REGISTER SELECT 2 | REGISTER SELECT 1 | REGISTER SELECT 0 |
| RECEIVER BUFFER REGISTER (READ ONLY) | RBR | 8 OR D/C=A/B=0 | BIT 7 (MSB) | BIT 6 | BIT 5 | BIT 4 | BIT 3 | BIT 2 | BIT 1 | BIT 0 (LSB) |
| TRANSMIT HOLDING REGISTER (WRITE ONLY) | THR | 8 OR D/C=A/B=0 | BIT 7 (MSB) | BIT 6 | BIT 5 | BIT 4 | BIT 3 | BIT 2 | BIT 1 | BIT 0 (LSB) |
| INTERRUPT ENABLE REGISTER | IER | 1 | 0 | 0 | 0 | ENABLE EXTERNAL INT (SP=1) | ENABLE MCR/SCR STATUS | ENABLE DIVISOR/ LCR STATUS | ENABLE THRE | ENABLE RDA/OE |
| INTERRUPT ID REGISTER (READ ONLY) | IIR | 2 | 0 | 0 | 0 | 0 | 0 | INTERRUPT ID 2 | INTERRUPT ID 1 | INTERRUPT ID 0 |
| LINE CONTROL REGISTER (READ ONLY) | LCR | 3 | 0 | SET BREAK | STICK PARITY | EVEN PARITY | PARITY ENABLE | NUMBER STOP | WORD LENGTH SELECT 1 | WORD LENGTH SELECT 0 |
| MODEM CONTROL REGISTER (READ ONLY) | MCR | 4 | 0 | 0 | 0 | LOOP | 0 | 0 | RTS | DTR |
| LINE STATUS REGISTER | LSR | 5 | 0 | 0 | TRANSMIT HOLDING READY (READ ONLY) | CH B TX TRANSMIT BREAK (READ/WRITE) | CH B TX FRAMING ERROR (READ /WRITE) | CH B TX PARITY ERROR (READ /WRITE) | CH B RX OVERRUN ERROR (READ ONLY) | CH B RX DATA READY (READ ONLY) |
| MODEM STATUS REGISTER (READ/WRITE) | MSR | 6 | DCD | RI | DSR | CTS | 0 | 0 | 0 | 0 |
| SCRATCH REGISTER | SCR | 7 | BIT 7 | BIT 6 | BIT 5 | BIT 4 | BIT 3 | BIT 2 | BIT 1 | BIT 0 |
| DIVISOR LATCH (LS) (READ ONLY) | DLL | 9 | BIT 7 | BIT 6 | BIT 5 | BIT 4 | BIT 3 | BIT 2 | BIT 1 | BIT 0 |
| DIVISOR LATCH (MS) (READ ONLY) | DLM | A | BIT 15 | BIT 14 | BIT 13 | BIT 12 | BIT 11 | BIT 10 | BIT 9 | BIT 8 |
| CONFIG. CONTROL REGISTER | CCR | B | 16C550 PARALLEL ENABLE (SP=1) | 0 | 0 | OSC OFF | DIVISOR PRESCALE 3 | DIVISOR PRESCALE 2 | DIVISOR PRESCALE 1 | DIVISOR PRESCALE 0 |

FIG. 5C

| REGISTER | | ADDRESS WR0[3:0] | DATA BIT NUMBER | | | | | | | |
|---|---|---|---|---|---|---|---|---|---|---|
| | | | D7 | D6 | D5 | D4 | D3 | D2 | D1 | D0 |
| COMMAND REGISTER | WR0 | D/C=0 A/B=1 ONECS: RS=1 RGSEL0=1 | CRC RESET 1 | CRC RESET 0 | COMMAND CODE 2 | COMMAND CODE 1 | COMMAND CODE 0 | REGISTER SELECT 2 | REGISTER SELECT 1 | REGISTER SELECT 0 |
| TX/RX INTERRUPT DATA TRANSFER | WR1 | 1 (WRITE ONLY) | 0 | 0 | 0 | RECEIVE INTERRUPT MODE 1 | RECEIVE INTERRUPT MODE 0 | PARITY SPECIAL | TX INT ENABLE | EXTERNAL INTERRUPT ENABLE |
| INTERRUPT VECTOR REGISTER | WR2 RR2 | 2 (READ/WRITE) | BIT 7 (MSB) | BIT 6 | BIT 5 | BIT 4 | BIT 3 | BIT 2 | BIT 1 | BIT 0 (LSB) |
| RECEIVE CONTROL | WR3 | 3 (WRITE ONLY) | RX BITE/CHAR 1 | RX BITE/CHAR 0 | AUTO ENABLE | ENTER HUNT MODE | RX CRC ENABLE | ADDRESS SEARCH MODE (SDLC) | SYNC CHAR LOAD INHIBIT | RECEIVER ENABLE |
| TX/RX MISC MODES | WR4 RR4 | 4 (READ/WRITE) | CLOCK RATE 1 | CLOCK RATE 0 | SYNC MODE 1 | SYNC MODE 0 | STOP BITE 1 | STOP BITE 0 | EVEN PARITY | PARITY ENABLE |
| TRANSMIT CONTROL | WR5 RR5 | 5 (READ/WRITE) | DTR | TX BITE/ CHAR 1 | TX BITE/ CHAR 0 | SEND BREAK | TRANSMIT ENABLE | SDLC/ CRC-16 | RTS | TX CRC ENABLE |
| SYNC CHAR OR SDLC ADDRESS | WR6 RR6 | 6 (READ/WRITE) | BIT 7 | BIT 6 | BIT 5 | BIT 4 | BIT 3 | BIT 2 | BIT 1 | BIT 0 |
| SYNC CHAR OR SDLC FLAG | WR7 RR7 | 7 (READ/WRITE) | BIT 7 | BIT 6 | BIT 5 | BIT 4 | BIT 3 | BIT 2 | BIT 1 | BIT 0 |
| TRANSMIT BUFFER REGISTER | WR8 | 8 D/C=A/B=1 (WRITE ONLY) | BIT 7 | BIT 6 | BIT 5 | BIT 4 | BIT 3 | BIT 2 | BIT 1 | BIT 0 |
| MASTER INTERRUPT CONTROL | WR9 RR9 | 9 (READ/WRITE) | RESET COMMAND 1 | RESET COMMAND 0 | 0 | STATUS HIGH | MASTER INTERRUPT ENABLE (MIE) | 0 | 0 | VECTOR INCLUDES STATUS |
| TX/RX MISC CONTROL | WR10 | 10 (WRITE ONLY) | CRC PRESET | DATA ENCODING 1 | DATA ENCODING 0 | GO ACTIVE ON POLL | MARK IDLE | ABORT ON UNDERRUN | LOOP | 6 BIT SYNC |
| CLOCK MODE CONTROL | WR11 RR11 | 11 (READ/WRITE) | MANCHESTER ENCODE TRANSMIT | RECEIVE CLOCK SOURCE 1 | RECEIVE CLOCK SOURCE 0 | TRANSMIT CLOCK SOURCE 1 | TRANSMIT CLOCK SOURCE 0 | TRXC PIN OUTPUT | TRXC OUTPUT SOURCE 1 | TRXC OUTPUT SOURCE 0 |
| LOWER BYTE BAUD GENERATOR | WR12 RR12 | 12 (READ/WRITE) | BIT 7 | BIT 6 | BIT 5 | BIT 4 | BIT 3 | BIT 2 | BIT 1 | BIT 0 |
| UPPER BYTE BAUD GENERATOR | WR13 RR13 | 13 (READ/WRITE) | BIT 15 | BIT 14 | BIT 13 | BIT 12 | BIT 11 | BIT 10 | BIT 9 | BIT 8 |
| MISC CONTROL | WR14 RR14 | 14 (READ/WRITE) | PLL COMMAND 2 | PLL COMMAND 1 | PLL COMMAND 0 | LOCAL LOOPBACK | AUTO ECHO | TX CRC-32 | BAUD GENERATOR SOURCE | BAUD GENERATOR ENABLE |
| EXTERNAL/ STATUS INTERRUPT CONTROL | WR15 RR15 | 15 (READ/WRITE) | BREAK/ABORT INTERRUPT ENABLE | TX UNDERRUN/ EOM INT EN | CTS INT EN | SYNC/HUNT INT EN | DCD INT EN | DSR INT EN | ZERO COUNT INT EN | RI INT EN |

FIG. 5D

| REGISTER | | ADDRESS WR0(3:0) | DATA BIT NUMBER | | | | | | | |
|---|---|---|---|---|---|---|---|---|---|---|
| | | | D7 | D6 | D5 | D4 | D3 | D2 | D1 | D0 |
| TX/RX BUFFER/ EXTERNAL STATUS | RR0 | 0 | BREAK/ ABORT DETECT | TRANSMIT UNDERRUN /EOM | CTS | HUNT | DCD | TRANSMIT BUFFER EMPTY | ZERO COUNT | RECEIVE CHAR AVAIL |
| SPECIAL RECEIVE CONDITION STATUS | RR1 | 1 | END OF FRAME (SDLC) | CRC/ FRAMING ERROR | RECEIVE OVERRUN ERROR | PARITY/ CRC-32 ERROR | BIT REMAINDER 2 | BIT REMAINDER 1 | BIT REMAINDER 0 | ALL SENT |
| INTERRUPT VECTOR REGISTER | RR2 | 2 | BIT 7 (MSB) | BIT 6 | BIT 5 | BIT 4 | BIT 3 | BIT 2 | BIT 1 | BIT 0 (LSB) |
| INTERRUPT PENDING REGISTER | RR3 | 3 | 0 | 0 | CH A RECEIVE INT PENDING | CH A TRANSMIT INT PENDING | CH A EXT/STAT INT PENDING | CH B INTERRUPT ID 2 | CH B INTERRUPT ID 1 | CH B INTERRUPT ID 0 |
| RECEIVE DATA REGISTER | RR8 | 8 D/C=1 A/B=1 | BIT 7 | BIT 6 | BIT 5 | BIT 4 | BIT 3 | BIT 2 | BIT 1 | BIT 0 |
| MISC STATUS | RR10 | 10 | ONE CLOCK MISSING | TWO CLOCKS MISSING | DSR | LOOP SENDING | CRC16 | CRC32 | ON LOOP | RI |

RECONFIGURABLE ARCHITECTURE FOR MULTI-PROTOCOL DATA COMMUNICATIONS HAVING SELECTION MEANS AND A PLURALITY OF REGISTER SETS

This is a continuation of application Ser. No. 07/528,951 filed May 25, 1990 now abandoned.

BACKGROUND OF THE INVENTION

1. Field of the Invention

This invention relates to the field of universal synchronous-asynchronous receiver/transmitters.

2. Background Art

Computers or other processing units are often coupled to peripheral devices such as printers, communication devices, etc. A communication program executed on the host computer controls the transfer of data from the host computer to the communications device. The central processing unit (CPU) or processor of the host computer implements the transmission of the data from memory to the communications device. A processor generally receives and transmits data in parallel. However, peripheral devices generally require serial data streams. When a communication device is coupled to a computer processor, the parallel output of the computer processor is first converted to serial output and provided through a serial port to the peripheral device. The peripheral device then operates on the serial data stream. For example, if the peripheral device is a modem, the serial data stream is modulated and transmitted on a transmission line.

Many communication devices such as modems or protocol converters are "intelligent," that is, they have their own processing means built in. When such an intelligent device receives a serial data stream, it converts the serial data stream to a parallel data stream for processing. Therefore, when a computer communicates with a peripheral device through a serial port, the data stream undergoes a parallel to serial to parallel conversion. The prior art methods of this parallel to serial to parallel conversion require dedicated hardware and software. In addition, special effort is required to perform format identification (data rate, parity, etc.). Known patterns are required and formats are often limited. This conversion also limits the maximum data rate.

In addition, the communication may be either asynchronous or synchronous. Many computer systems use one converting device for performing parallel to serial conversion on synchronous data and a separate converting device for asynchronous data. This is because there are standard interfaces for each type of communication. This results in complex circuitry requirements.

The transfer of the data from within the computer to the serial output also requires special formatting. This formatting control may come from customized software in the computer, or as either a software driver or separate processor communicating with a standardized software interface. The prior art provides solutions for only one of the above techniques at a time. This requires separate and distinct solutions which cannot be easily interchanged.

Therefore, it is an object of the present invention to provide a universal and configurable architecture for serial communications.

It is another object of the present invention to emulate the register set of a plurality of communication devices into a single device.

It is still another object of the present invention to provide a method and apparatus for converting parallel data and to implement protocol conversion on such data.

SUMMARY OF THE INVENTION

The present invention provides a configurable architecture for serial communications. The architecture can emulate parallel to serial conversion devices for both synchronous and asynchronous data transmission. The invention uses a plurality of register sets to emulate standard interfaces. One register block performs data and control storage to communicate between a host computer and a local processor. A second register block emulates a serial communications controller (SCC) with its own data control storage and features to implement a number of communication protocols. The SCC provides serial data output. This invention provides an architecture of flexibility optimizing a configuration for synchronous and asynchronous requirements using the same basic blocks while still maintaining an interface compatible with standard requirements.

The present invention may be configured to provide a 550 type UART in parallel with an 8530 type device for synchronous/asynchronous communication or configured to provide a 550 device in series with an 8530 device. In any configuration, the present invention provides a standard interface while reducing the circuitry requirements over prior art schemes.

This invention is directed to a serial packet controller providing a multi-function synchronous asynchronous communications device with an optimized interface for applications requiring a 16450/16550 interface. In one embodiment, the invention is designed to allow a CPU and a local protocol controller to interface, while appearing to be communicating with a standard UART interface. The controller can then use a serial communications controller (SCC) block for any synchronous or asynchronous protocol. In an alternate embodiment, the present invention may be configured to allow a single device to be programmable to behave either as asynchronous UART or synchronous USART.

BRIEF DESCRIPTION OF THE DRAWINGS

FIG. 5A illustrates the mapping of the 550 register set of one embodiment of this invention.

FIG. 5C illustrates the mapping of the channel A write registers of one embodiment of this invention.

DETAILED DESCRIPTION OF THE INVENTION

A method and apparatus for serial communications is described. In the following description, numerous specific details, such as number of bits, number of registers, etc., is set forth in detail in order to provide a more thorough description of this invention. It will be apparent, however, to one skilled in the art, that this invention may be practiced without these specific details. In other instances, well known features have not been described so as not to unnecessarily obscure this invention.

Figure 1:
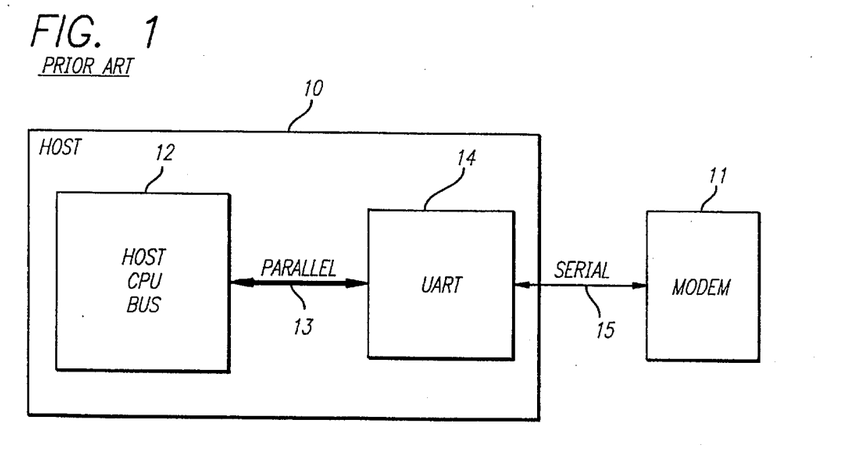
FIG. 1 is a block diagram of one prior art processor/communications device interface.

FIG. 1 illustrates a prior art host/communications device system. A host computer, generally indicated by dashed line 10, includes in part a CPU bus 12. The CPU bus 12 provides a parallel output 13 to a UART 14. The UART converts the parallel stream into a serial stream 15 for output through a serial port. The serial stream 15 is connected via the serial port to an external communications device such as modem 11.

The UART 14 may be implemented with a device such as the SSi 73M550 UART, manufactured by Silicon Systems, Inc., of Tustin, Calif., assignee of the present patent application. This device, and others like it, shall be referred to herein as "550 type devices" or "550 type UART's".

Often, a communications device such as a modem, is "intelligent," that is, the modem includes a processing means such as a microprocessor for improving the performance of the device. A microprocessor generally requires data in a parallel format. Therefore, present day communication devices include a second converting means for converting the serial output of a 550 UART to parallel data for use by the processor. The processor provides parallel output which then must be reconverted to serial data for eventual transmission by the modem.

Figure 2:
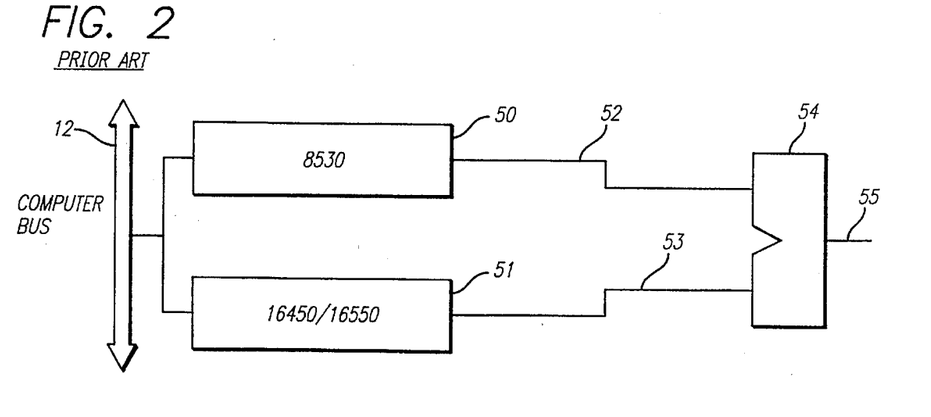
FIG. 2 is a block diagram of a prior art system for synchronous and asynchronous communication.

In addition, communications between a host computer and a communications device such as a modem may be made synchronously or asynchronously. The prior art, as illustrated in FIG. 2, provided a dedicated device for asynchronous communication and a dedicated device for synchronous communication. The synchronous communication block 50 may be a serial communications controller (SCC) such as the Z8530 SCC manufactured by Zilog. Other manufacturers produce SCC devices which operate identically to or compatible with the Z8530 SCC. In this application, such devices are referred to as 8530-type SCC devices or 8530-type controllers. The 8530 SCC typically includes two full duplex channels. That is, each channel can receive serial data and convert it to parallel or receive parallel data and convert it to serial. These channels are referred to as channel A and channel B.

Block 51 represents an asynchronous communications device such as the SSi 73M550 UART or the SSi 73M450 UART manufactured by Silicon Systems, Inc. of Tustin, Calif., assignee of the present patent application. This device, and others like it, shall be referred to herein as "450 type devices" or "450 type UART's". A device implementing both a 550 type UART and a 450 type UART is said to have a "450/550 interface." The synchronous communications device 50 provides output 52 to multiplexer 54. The asynchronous device 51 provides output 53 to multiplexer 54. The serial output 55 is selected depending on whether asynchronous or synchronous communication is desired.

Figure 4:
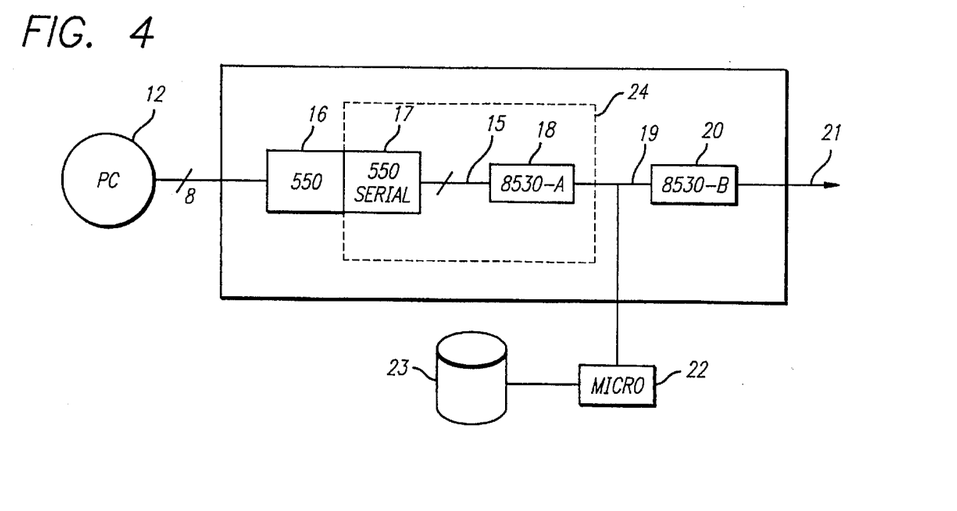
FIG. 4 is a block diagram of a prior art system configuration for communication to a local processor.

It is often desired to provide a system where a 550 type UART is coupled in series with an 8530 type UART. This is often the case when a communications device has an associated processor. An example of a prior art scheme implementing a 550 UART and an 8530 SCC in connection with a microprocessor is illustrated in FIG. 4. A CPU bus 12 is coupled to a 550 UART. The 550 UART consists of two components, a 550 register set 16 and a 550 serializer 17. The 550 register set 16 receives the parallel data from the CPU bus 12 and provides it to the serializer 17 for conversion to serial output. The serial output 15 of the 550 UART is provided to one channel of an 8530 SCC such as channel A block 18.

The 550 register set consists of a number of registers for receiving data from the host computer CPU bus. Typically, these registers include a receiver buffer register, line control register, divisor latch registers, line status registers, transmitter holding register, modem control register, modem status register, interrupt enable register, interrupt ID register and FIFO control register. After data has been provided to these registers, it is provided to the serializer for conversion to a serial stream.

The 8530-A block 18 (channel A of the SCC) converts the serial data to parallel data and provides a parallel output on bus 19. A microprocessor 22 is coupled to bus 19 to receive the parallel data and perform any required processing. The microprocessor 22 has associated memory 23 which may be disk storage, RAM or any other suitable storage means. The processed parallel data from microprocessor 22 is then provided to 8530-B block 20 (channel B of the SCC) for conversion to serial output 21. Serial output 21 is provided to a communications device such as a modem pump.

Many applications programs written for personal computers and other types of computers are designed to communicate with the 450/550 interface or to the 8530 interface. In particular, communications programs designed to communicate or transmit data on a modem are written to communicate with a register set associated with a 450 type UART or 8530 type device. Therefore, this invention emulates the register set of 450 and 8530 type UART's, but does not require all of the circuitry associated with a prior art 450 or 550 type UART. The invention also provides the functionality of an 8530 SCC without requiring all of the circuitry associated with a prior art SCC.

Figure 6:
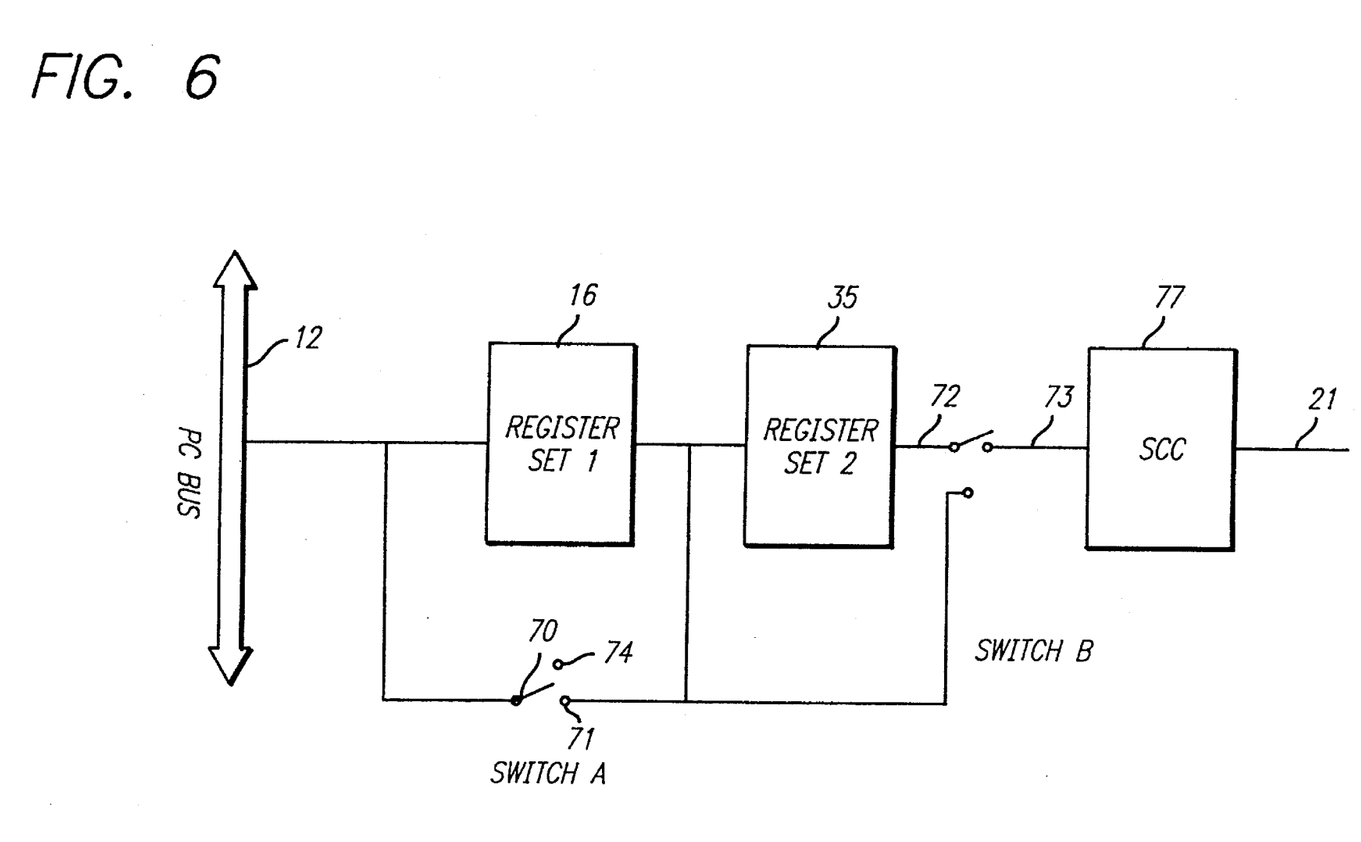
FIG. 6 is a block diagram of the preferred embodiment of the present invention.

A block diagram of the present invention is illustrated in FIG. 6. A PC bus 12 is coupled to a first register set 16 at node 70. Node 70 is also coupled to one terminal of switch A. The output of register 16 is coupled to the input of a second register set 35 at node 71. The output of the second register set 35 is provided at node 72.

Switch A may be coupled to node 74 (open circuit) or to node 71. A second switch, switch B is selectively coupled between SCC block 77 at node 73 and node 72 or node 71. SCC block 77 provides a serial output on line 21.

In this invention, the first register set 16 emulates a 550 register set and the second register set 35 emulates an 8530 register set. The SCC block 77 emulates the conversion circuitry of an 8530 type device. The device of FIG. 6 is configurable in a variety of ways by selectively opening and closing switches A and B.

In the following description, this invention is described as emulating a 550 register set and an 8530 register set. However, this description is for purposes of example only. This invention is not limited to such devices but provides a method and apparatus for emulating a plurality of communications devices with three functional blocks and two switches. First and second blocks emulate the register sets of serial communications devices. The third block emulates and provides the functionality of parallel to serial converting devices. The converting means is also used to implement a plurality of protocols for serial communication, such as monosync, bisync, HDLC and SDLC.

When switch A is coupled to node 71 and switch B is coupled to node 72, the device is configured as a 550 type device in series with an 8530 device. This is referred to in this invention as "dual processor parallel data mode". When switch A is coupled to node 71 and switch B is coupled to node 71, the device is configured as either a 550 type device or an 8530 type device. This is referred to in this invention as "single processor mode". When switch A is coupled to node 74 (open), and switch B is coupled to node 72, the device of FIG. 6 is configured in what is referred to as "single processor parallel data mode".

DUAL PROCESSOR PARALLEL DATA

Figure 3A:
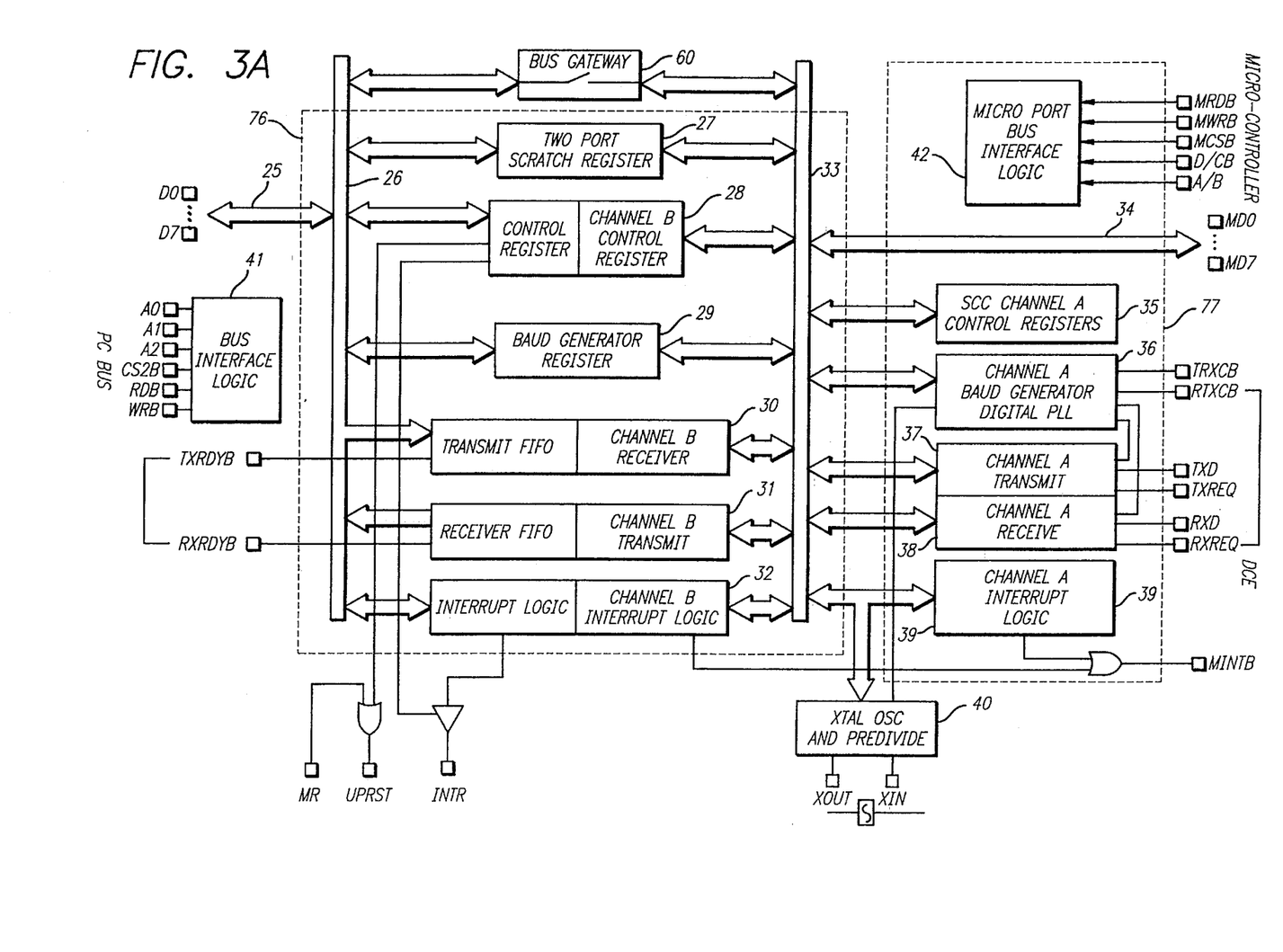
FIG. 3A is a block diagram of one configuration of the present invention.

FIG. 3A illustrates in detail the device of FIG. 6 configured as a 550 type device. The 550 register set is identified by dashed line 76, the 8530 registers are identified as block 35 and the SCC block is identified by dashed line 77.

The data on bus 25 is provided to the 550 register block 76. The bus gateway 60 is open in this embodiment. Therefore, the data is not provided directly to 8530 register block 35. The SCC block 77 emulates the 550 serializer block 17 (see FIG. 4). The 550 register block 76 and SCC block 77 are described in detail as follows.

550 REGISTER BLOCK 76

The 550 register set block 76 is coupled directly to a host computer CPU through bus 25 and bus interface logic 41. Bus 25 receives data bits D0–D7 in parallel and provides parallel output to bus 26. The bus interface logic 41 receives control signals from the PC bus and provides them to bus 26.

The 550 register block 76 utilizes a number of registers to emulate the register set of a 550 type UART. In this invention, dual port registers are utilized so that data written into a register may be read onto a second bus 33. The registers of the 550 register block 76 are a scratch register 27, control registers 28, baud generator register 29, transmit register 30, receive register 31 and interrupt logic register 32.

The scratch register 27 provides a communication path outside the data path. In the prior art, modem protocol is based on the fact there is no control path outside the data path. The AT command set (auto sync and auto stream) are implemented because there is no control path outside the data path. The scratch register 27 can be used for such a control path.

A control register block 28 is shown symbolically as two separate registers; a 550 control register and a channel B control register. In the preferred embodiment of this invention, register 28 is a single dual port register. However, the dual port register may be utilized as if it were, in fact, two separate registers. Control information from the host computer can be written to the control register block 28. Data written to the register block 28 can immediately be read onto bus 33 by the SCC block 77. Bus block 28 functions as a control register for the 550 register set block 76 and as a "channel B" control register block for the SCC block 77.

As noted previously, an SCC block in the prior art has two channels, channel A and channel B. In this invention, the SCC block 77 implements one channel, channel A, of the prior art SCC. The 550 registers, which are readable by the SCC block 77 are referred to in this invention as the "channel B" registers.

Referring again to the 550 register set block 76, a baud generator register 29 is coupled to bus 26 and bus 33. The baud generator register 29 receives the baud rate signals from the PC bus. An applications program communicating through the communications device data identifies a selected baud rate for transmitting data, e.g. 300 baud, 1,200 baud, 2,400 baud, etc. This invention is not limited to such baud rates, but is limited only by the bus speed of the host computer. In the prior art, communications were limited by the channel speed, that is, the channel for converting serial data to parallel data. It may be that the application program communicating with the present invention has a maximum communication speed of 2,400 baud. However, the bus speed of the host computer may be much greater than 2,400 baud. Even so, the application program must receive a confirmation that communication is occurring at the desired rate. By intercepting the baud rate in the baud generator register 29, a confirmation signal can be generated and provided to the application program, even though communication is occurring at a higher rate.

The transmit register 30 is implemented with a first in-first out (FIFO) register. The register 30 receives transmit data information from bus 26 and therefore emulates a 550 type UART transfer register. This data is immediately available to be read onto bus 33, and therefore register 30 emulates a channel B receive register of an 8530 type device. The output of register 30 is provided to bus 33.

Similarly, register 31 emulates a receive FIFO for a 550 type UART and a transmit FIFO for channel B of an 8530 device. The interrupt logic register 32 provides interrupts to the host computer and to the local microprocessor whenever data is provided to any of the registers.

The control registers 28 of this invention emulate a number of registers in a typical 550 type UART, such as the SSi 73M550. The registers 28 emulate line control registers, deviser latch registers, line status registers, modem control registers, modem status registers, and FIFO control registers of a 550 UART. However, the implementation of this invention allows a number of elements of a prior art 550 type UART to be eliminated. In particular, receiver shift registers, receiver timing and control, baud rate generators, transmitter timing control, transmitter shift registers and modem control logic hardware are eliminated in the 550 register block of this invention. The functionality of those elements are implemented in the 8530 block 77.

8530 SCC BLOCK 77

The 8530 block (or SCC block 77) includes a microport bus interface logic block 42 for communicating with a local microprocessor. A bus 34 can provide the parallel data bits D0–D7 directly to the local microprocessor. The SCC control registers 35 are coupled to bus 33 and receive data and control signals. Baud generator/digital PLL block 36 is a clock generator. It includes a baud rate generator that can be written to the baud generator register 29. A digital phase lock loop is implemented to recover clock signals encoded in data.

The transmit and receive channels 37 and 38 are the actual engines that implement the particular protocols, receive bits that come out of the control register, and provide appropriate output. The blocks control the communication format, for example, synchronous, asynchronous, bisync, monosync, HDLC and SDLC formats can all be implemented in this invention. Block 39 is the channel A interrupt logical block. A crystal oscillator and pre-divide block 40 implements a programmable frequency generator.

SINGLE PROCESSOR MODE

Figure 3B:
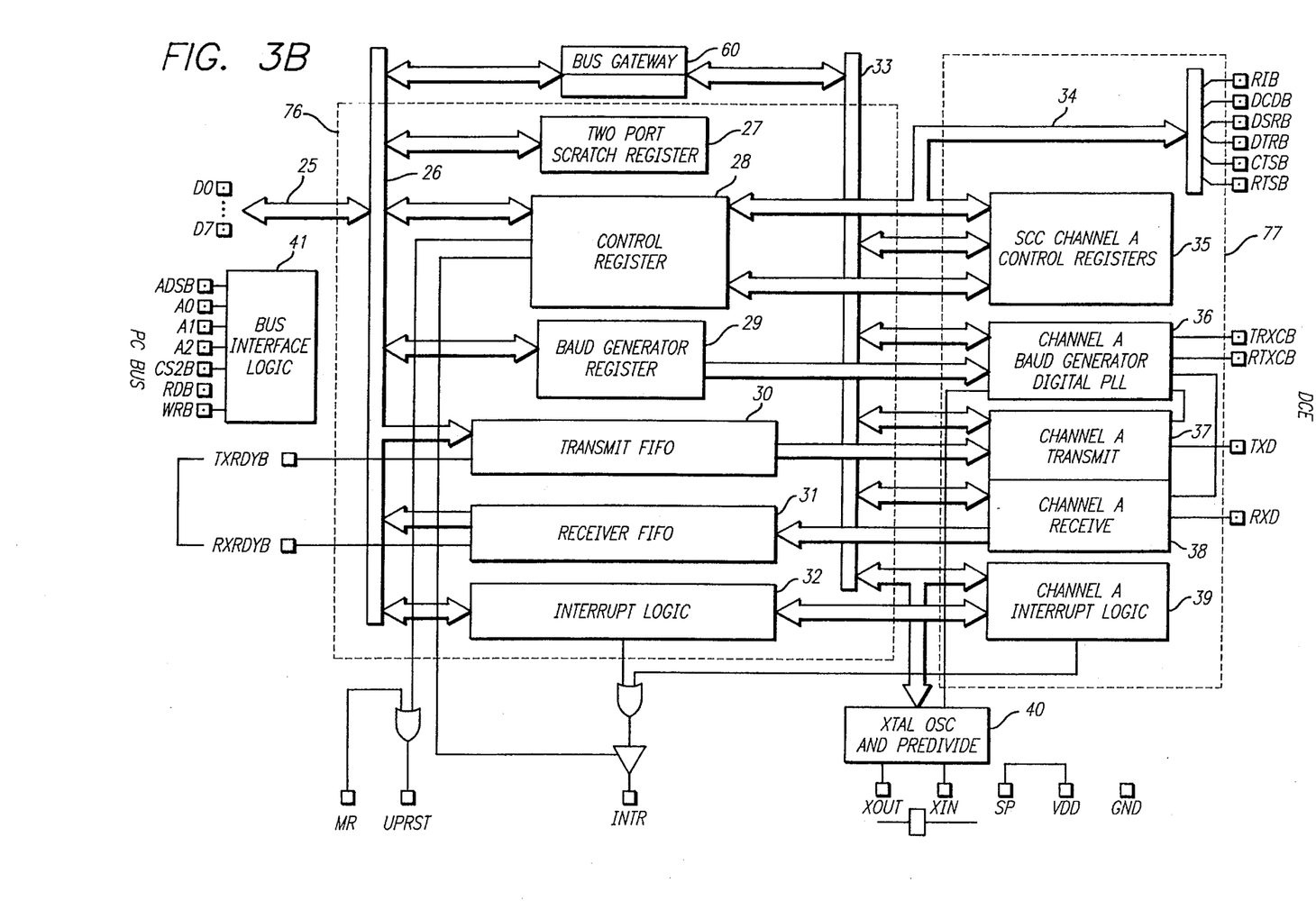
FIG. 3B is a block diagram of a second configuration of the present invention.

FIG. 3B illustrates in detail the device of FIG. 6 configured so as to be either of a 550 type device or a 8530 type device. The bus gateway 60 is closed in this embodiment and bus 33 is only coupled to the SCC block 77 channel B registers. Therefore, the data from bus 25 is provided both to the 550 register block 76 and directly to the 8530 register block 35 on bus 33. The baud generator block 36, transmit block 37, receive block 38 and interrupt logic block 39 are all coupled directly to the bus 33. Channel A of blocks 28–32 is not illustrated since it is not utilized in this embodiment.

To operate the device as a 550 type device, control signals form block 28 are provided to the SCC block 77 so that the device operates as a 550 type device. In the 8530 mode, the scratch register 27 is defined to be the control register of the SCC block 77.

SINGLE PROCESSOR PARALLEL DATA

Figure 3C:
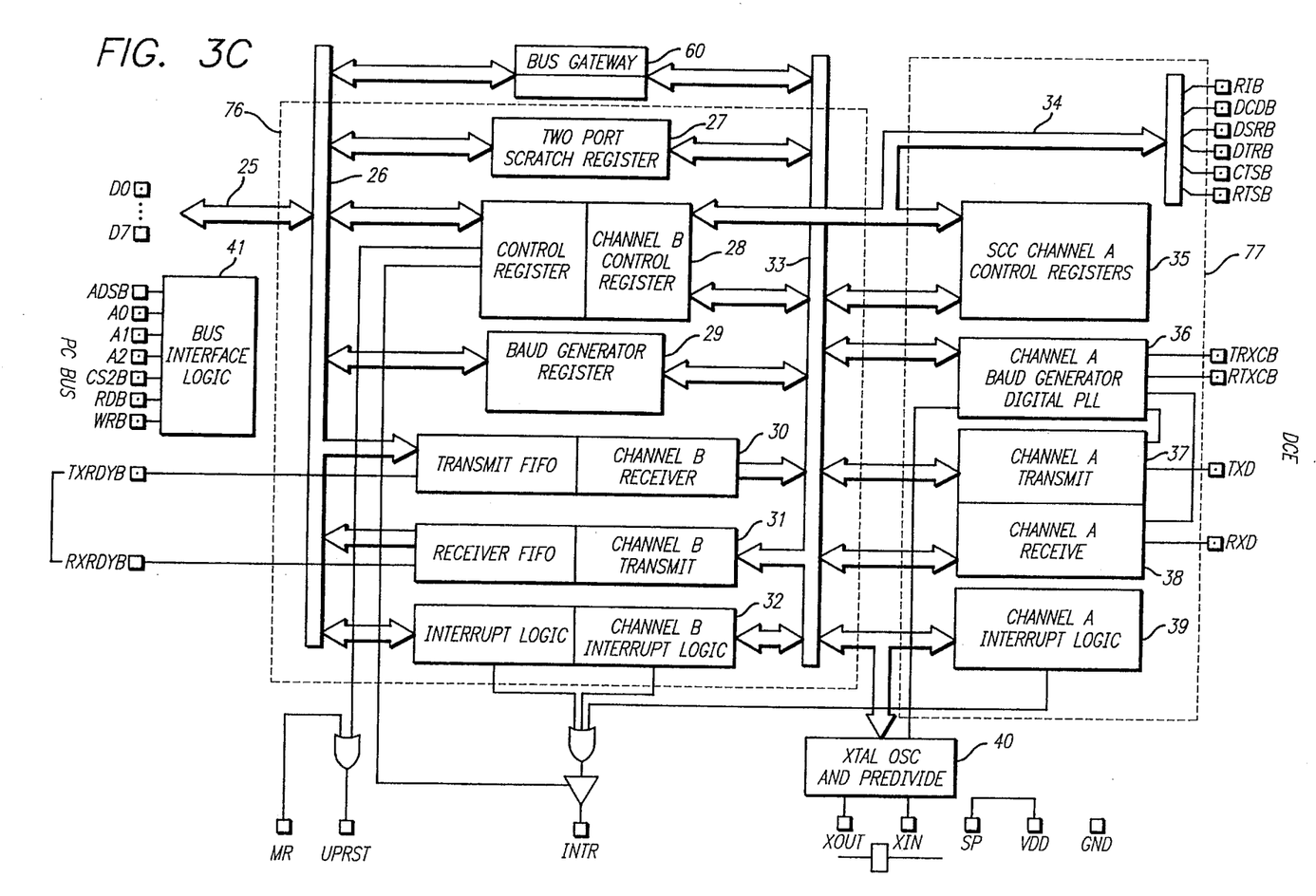
FIG. 3C is a block diagram of a third configuration of the present invention.

The single processor parallel data mode is illustrated in FIG. 3C. Bus 33 is coupled to both the SCC block 76 B channels and to the registers 27–32. In addition, the bus gateway 60 is closed. The single processor parallel data mode is used to remove the need for the controller and allow software drivers to perform virtually any protocol while maintaining the standard asynchronous interface. Characters written to the 550 register set are saved and an interrupt is generated. A software driver can then read the character from channel A (accessed through the registers) and use the SCC block 77 to send the data formatted as required by the protocol.

This invention provides a standard device interface but does not contain any of the circuitry normally required to serialize the data since the data remains parallel. This provides hardware savings. In addition, because the data remains in parallel, operations can be performed at bus speed, greatly enhancing performance.

Devices that connect to computer buses and perform protocol conversion are required to perform many functions. Such protocol conversion may consist of simple command interpretation, data formatting, data modification or electrical format conversion such as found in a modem. Often a processor is used to supervise the conversion function. A parallel port is usually used to communicate with the computer bus. One typical method for implementing the protocol function is to provide a device to perform a standard interface to a central processing unit and convert the data to a serial format. This data is then converted to a format for use by the device processor (such as a parallel format). Another device is used to implemented the protocol conversion. This method requires three conversion blocks in a plurality of devices.

The present invention provides appropriate hardware for implementing various protocol conversions. The protocol conversions are implemented in software in a local microprocessor coupled to the device of this invention. Protocol, such as bisync, monosync, HDLC and SDLC are well known in the art and are easily implemented in software in the local microprocessor.

Translating data stored within a computer to formatted serial output from the computer may be accomplished with one of several techniques. Formatting control may be provided by customized software in the computer or in a separate driver or processor communicating with a standard interface. The present invention provides a reconfigurable architecture to perform any of the above methods.

The device may be reconfigured to be software selectable as either a device that the register block represents or as the SCC and its associated features. The advantage of the architecture is its flexibility optimizing a configuration for each need using the same basic blocks while always maintaining an interface compatible with standard requirements. This reconfigurability is not possible without the integration of this device.

FIGS. 5A through 5D illustrate the register mapping of this invention. Each register and an associated abbreviation are identified in the first two columns of FIGS. 5A–5D. The third column identifies the address of the register and the remaining eight columns identify the data bit number values for each register. This mapping provides a standard interface to application programs written to communicate with a 550 type UART. For example, prior art applications programs are written to write to eight address locations in a specific memory location. This invention provides that all three register sets fit into the eight address locations.

Figure 5B:
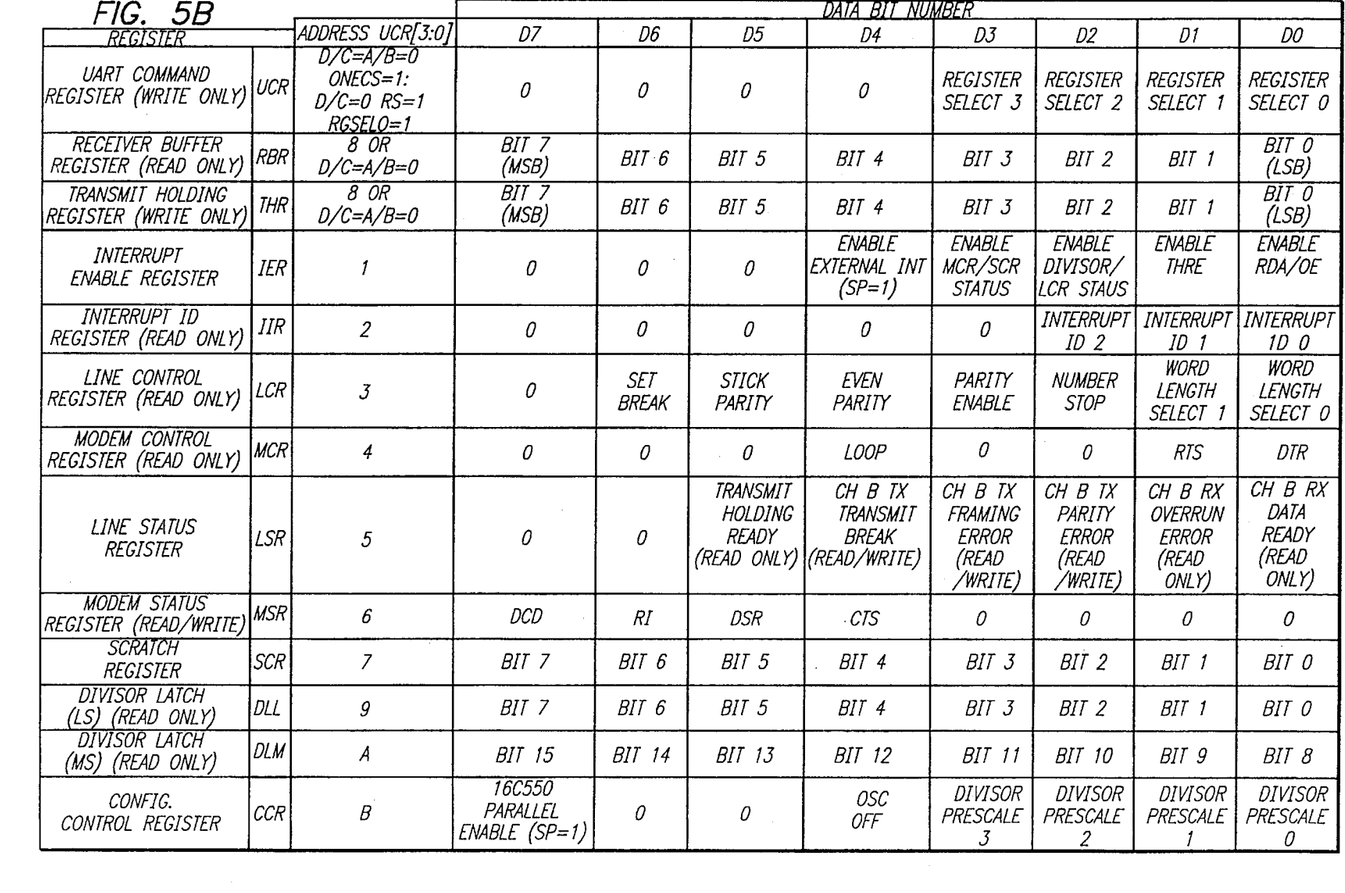
FIG. 5B illustrates the mapping of the channel B registers of one embodiment of this invention.

FIG. 5A illustrates the register mapping of the 550 registers. FIG. 5B illustrates the register mapping of the channel B registers. In this invention, the 550 registers and channel B registers are implemented with a single dual port register. Certain of the registers are shared and certain address locations are shared so this invention maps the registers to take advantage of this overlap. Referring to FIG. 5A, a "loop" mode is enabled by setting the appropriate bit (D4) of the modem control register. Referring now to FIG. 5B, the same bit (D4) of the modem control register is a loop enable location. Note that the modem control register of channel B is "read only". This is because the 550 register set and channel B registers are implemented as single dual port registers. The 550 registers are written to by the host CPU bus. The data is then available to be read onto bus 33 as if reading from the channel B register of an 8530 device. The configuration control register of FIG. 5B is located in the predivide block 40 of FIG. 3A.

Figure 5D:
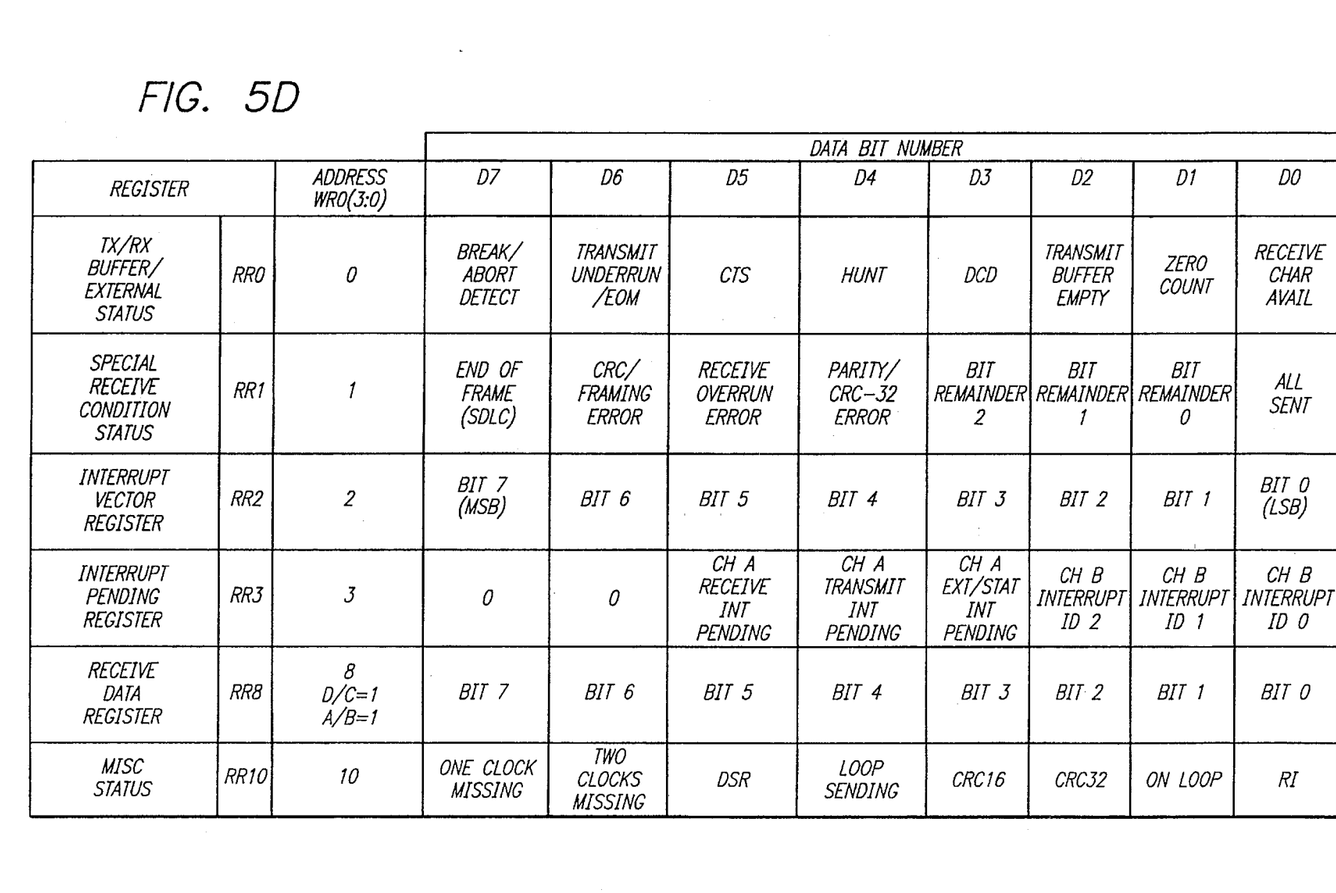
FIG. 5D illustrates the mapping of the channel A read registers of one embodiment of this invention.

FIGS. 5C and 5D illustrate the mapping of the SCC block channel A write and read registers respectively.

Thus, a method and apparatus for emulating a plurality of serial communications devices has been described.

We claim:

1. A communication circuit comprising:

a first plurality of registers at a first port coupled to a first bus of a host computer for receiving parallel data and control signals, said first plurality of registers emulating an interface of a first communications device type at said first port by providing registers having addresses of said first communications device type, said first plurality of registers providing said parallel data and control signals as output to a first node, said first node coupled to a second port;

a second plurality of registers coupled to said first node for receiving said parallel data and control signals, said second plurality of registers emulating an interface of a second communications device type at said first node by providing registers having addresses of said second communications device type, said second plurality of registers providing said parallel data and control signals as output to a second node;

switch means coupled between said first bus and said first node, said switch means for selectively coupling and decoupling said first bus to said first node;

selection means coupled to said first and second nodes;

control means coupled to said selection means, said control means for receiving said parallel data and said control signals and for converting between said parallel data and serial data, and for providing said serial data to a third port, said control means comprising first serializing means corresponding to said first communications device type and second serializing means corresponding to said second communications device type, said first and second serializing means comprising common transmit and receive circuitry, wherein said selection means selectively couples said first and second plurality of registers to said control means, said selection means further selecting said first serializing means when said first plurality of registers are selected and said second serializing means when said second plurality of registers are selected; and wherein said circuit provides emulation of a plurality of communication devices by selective operation of said switch means and said selection means.

2. The circuit of claim 1 wherein said first plurality of registers comprise dual port registers.

3. The circuit of claim 1 wherein said second plurality of registers comprise dual port registers.

4. The circuit of claim 1 wherein said first plurality of registers provides the functionality of a 450/550 type register set.

5. The circuit of claim 1 wherein said second plurality of registers provides the functionality of an 8530 type register set.

6. The circuit of claim 1 wherein said first plurality of registers are compatible with asynchronous communication protocols.

7. The circuit of claim 1 wherein said second plurality of registers are compatible with synchronous communication protocols.

8. The circuit of claim 1 wherein said control means provide the functionality of the conversion circuitry of an 8530 type communication device.

9. The circuit of claim 1 wherein when said host computer communicates with said first plurality of registers and said selection means selects said second plurality of registers and a processing means interfaces between said first and second plurality of registers via said first node, said circuit provides the functionality of a 550 type communications device coupled in series with a 8530 type communications device.

10. The circuit of claim 1 wherein when said first bus is uncoupled from said first node and said selection means selects said first plurality of registers, said circuit provides the functionality of an asynchronous interface and provides parallel data as output at said second port.

11. The circuit of claim 1 wherein when said first bus is coupled to said first node, said circuit operates as either a 550 type communication device or an 8530 type communication device depending on which plurality of registers is selected by said selection means.

12. The circuit of claim 1 wherein said switch means and said selection means are switchable in response to instruction from said host computer.

13. A circuit for providing a plurality of communications interfaces wherein a first plurality of registers is coupled to a host computer through a first bus, said first plurality of registers coupled to a second plurality of registers, said second plurality of registers coupled to a switching means, said switching means for coupling and uncoupling said second plurality of registers to said first bus, and a selection means coupled to a control means, said selection means for alternately coupling said control means to said second plurality of registers or to said first plurality of registers, and said control means coupled to a second bus;

said first plurality of registers emulating an interface of a first communications device on said first bus by providing registers having addresses of a 550 type device, said second plurality of registers emulating an interface of a second communications device by providing registers having addresses of an 8530 type device, said control means further comprising first and second serializing means for converting between parallel data and serial data, said first and second serializing means comprising common transmit and receive circuits, said first and second serializing means emulating 550 and 8530 type serializers respectively, wherein said selection means selects said first serializing means when said first plurality of registers are selected and selects said second serializing means when said second plurality of registers are selected;

said circuit for providing the functionality of said plurality of communication devices by selective operation of said switching means and said selection means.

14. The circuit of claim 13 wherein said circuit is configurable as a 550 type device in parallel with an 8530 type device by coupling said second plurality of registers to said first bus to permit said host computer to communicate with said first plurality of registers and said second plurality of registers, said selection means selecting between said first plurality of registers and said second plurality of registers based on which plurality of registers is currently communicating with said host computer.

15. The circuit of claim 13 wherein said circuit is configurable as a 550 type device in series with an 8530 type device wherein said host computer communicates with said first plurality of registers as a 550 type device, a processing means processes data between said first plurality of registers and said second plurality of registers, and said second plurality of registers is selected by said selection means to emulate an 8530 type device with respect to a serial port of said control means.

16. The circuit of claim 13 wherein said circuit is configurable so that said circuit operates as either a 550 type device or an 8530 type device.

17. A reconfigurable communication circuit comprising:

a first register set coupled to a host bus and a second bus, said first register set mapped for emulating an interface of a communications device on said host bus by providing registers having addresses of a first communications device type;

a second register set mapped for emulating an interface of a communications device by providing registers having addresses of a second communications device type, said second register set accessible via said second bus;

a switch coupled between said host bus and said second bus;

a conversion circuit having a serial port, said conversion circuit coupled via a parallel coupling to a selection means, said conversion circuit comprising a first serializer corresponding to said first communications device type and a second serializer corresponding to said second communications device type, said first and second serializers comprising common transmit channel circuitry and common receive channel circuitry;

said selection means selectively coupled to said first or second register set and selecting said first or second serializing means with said first or second register set, respectively.

18. The communication circuit of claim 17 wherein said first register set comprises a dual port register.

19. The communication circuit of claim 17 further comprising a local processor coupled via a parallel port to said second bus.

20. The communication circuit of claim 19 wherein said local processor implements protocol conversions.

21. The communication circuit of claim 17 wherein said first and second serializers further comprise a common baud generator circuit.

22. The communication circuit of claim 17 wherein said first communications device type is a 550 device type.

23. The communication circuit of claim 17 wherein said second communications device type is an 8530 device type.

24. The communication circuit of claim 22 wherein said circuit is configured to emulate a 550 device.

25. The communication circuit of claim 23 wherein said circuit is configured to emulate an 8530 device.

26. The communication circuit of claim 19 wherein said circuit is configured as an intelligent communication device.

27. A reconfigurable communication apparatus comprising:
- a first register set mapped for emulating the function of a 550 type interface to a host bus by providing registers having addresses of a 550 type device, said first register set further coupled to a second bus;
- a second register set mapped for emulating the function of a channel of an 8530 device by providing registers having addresses of an 8530 type device, said second register set accessible via said second bus;
- a switch coupled between said host bus and said second bus;
- a conversion circuit comprising first means for emulating the converting function of a channel of an 8530 device and second means for emulating a 550 serializer, said first and second means comprising common transmit channel circuitry and common receive channel circuitry, said conversion circuit having a serial data port, said conversion circuit coupled via a parallel coupling to a selection means;
- said selection means selectively coupling said conversion circuit to said first register set or said second register set, said selection means further selecting said first means for said first register set and said second means for said second register set.

28. The apparatus of claim 27 wherein said first register set comprises a dual port register.

29. The apparatus of claim 27 further comprising a local processor coupled via a parallel port to said second bus for supervising said converting function.

30. The apparatus of claim 29 wherein said local processor implements protocol conversions.

31. The apparatus of claim 27 wherein said first and second means further comprise a common baud generator circuit.

32. The apparatus of claim 27 wherein said apparatus is configured to emulate a 550 device.

33. The apparatus of claim 27 wherein said apparatus is configured to emulate an 8530 device.

34. The apparatus of claim 29 wherein said apparatus is configured as an intelligent I/O device.

\* \* \* \* \*